Patented Mar. 31, 1931

1,798,997

UNITED STATES PATENT OFFICE

CLEMENTS BATCHELLER, OF BROOKLYN, NEW YORK, ASSIGNOR, BY MESNE ASSIGNMENTS, TO BEMIS INDUSTRIES, INC., OF BOSTON, MASSACHUSETTS, A CORPORATION OF DELAWARE

SURFACE COLORATION OF BODIES

No Drawing.    Application filed February 23, 1926.    Serial No. 90,157.

My invention relates to the surface coloration of bodies, and particularly to bodies having an alkaline reaction.

Attempts have been made to color cementitious material, such as hydraulic cement shingles or tiles and imitation stone bodies made from cement, by incorporating inorganic material such as red oxide of iron or manganese dioxide with the ingredients making up the cement. In such methods a large quantity of coloring matter must be embodied in the article if it is to be distinguishable in the finished product. This is objectionable both from the standpoint of cost and from the standpoint of the physical properties of the object. The addition of the requisite coloring matter materially weakens the structure; in fact, the presence of certain inorganic coloring substances renders the object too weak for use in many instances. I have found that these detrimental results will not be encountered if the coloring matter is applied to the surface of the body.

When applying my invention to bodies which comprise hydraulic cement, coloring matter is preferably added in a powdered condition before the object has dried or set and may be applied by hand or by a suitable dusting apparatus. After the application of the powder, pressure is preferably applied in order to embed the coloring matter and to give to the object a smooth surface.

The objects may be of any desired shape and the body composition may vary in many ways, but it is preferably somewhat porous or moisture absorbent at the time of the treatment hereafter referred to. The object to be treated may, for example, be formed from hydraulic cement molded or otherwise shaped to the desired outline and have incorporated therein other substances such as fibrous bonding material, for example, asbestos fiber. A composition of this character is commonly used in the manufacture of so-called asbestos shingles—more properly called asbestos cement shingles—a product to which my invention may be applied to advantage.

In treating the so-called asbestos shingles according to my invention, I have found that the procedure now employed in their manufacture is adaptable to my invention. The fibrous material, to wit asbestos, is disintegrated in the presence of water in such a way that the single fibers of the material are separated from each other. The hydraulic cement is then added and the mixture is thoroughly mixed in a relatively large quantity of water. The liquid containing the suspended particles of cement and asbestos is conveyed to and spread upon an endless rotating porous belt through which the water flows leaving the hydraulic cement intermingled with the asbestos upon the belt. This mat is then conveyed through press rolls to a roller upon which the material is wound, superimposing one layer upon the other until the desired thickness is obtained. The laminated cylinder is thus formed, then cut and wound onto a transfer roller, from which it is unrolled as a mat upon a press plate or table, where it is compressed and cut into shingle blanks. These blanks are subsequently piled with sheets of oiled steel between them and subjected to high hydraulic pressure.

At any appropriate point between the formation of the mat and the subjection of the cut sheets to hydraulic pressure, the coloring matter is sifted on one surface of the body. The compression incorporates the coloring matter in the surface. It will be obvious, however, that the embedding of the coloring material in the surface may be accomplished in any way appropriate to the character of the product in hand.

A wide variety of coloring matters may be used, preferably such inorganic materials as hematite iron ore for red, manganese dioxide for brown or black, lead chromate for yellow, ultramarine for blue, and chrome oxide for green. These may also be combined and blended to give any shade desired.

My invention makes possible many color effects not hitherto attained. For example, no practical means have been known hitherto for obtaining a cement shingle of satisfactory green color. Chrome oxide (which is the best green) cannot be added to the cementitious ingredients of the shingle during the mixing stage, for the green color is not sufficiently intense to be visible when compounded with the hydraulic cement and the asbestos fibers, unless it is present in such a quantity that the shingle will be rendered commercially useless, due to its weakened condition. A shingle made in accordance with my invention, however, and coated with chrome oxide, is of a bright clear, permanent color.

A shingle, or other object, treated in accordance with the foregoing, is commercially satisfactory and is applicable for many purposes. Nevertheless, while the coloring matter in the surface adheres relatively strongly, there is a certain amount of dusting or rubbing off. Furthermore, in a cement shingle, the contained free lime works through the colored coating as a white bloom under certain conditions, and discolors the surface. In order to prevent both rubbing off of the coloring matter and also the possibility of "bloom", I prefer to further treat the object.

This further treatment comprises, briefly, the application to the surface of a metallic inorganic salt solution which, in the presence of an alkali, will form an insoluble compound. Various metallic salts undergo metathesis with alkali to form the insoluble hydroxide of the metal and the alkali salt of the anion. Certain other metallic salts form an insoluble basic salt in the presence of alkali. Both of these groups of compounds are applicable for use according to my invention.

Materials made from hydraulic cement, lime, concrete, and the like usually contain sufficient free lime (calcium hydroxide) to be used without the addition of an alkaline material. Other bodies such e. g. as the so-called "paper" shingles, or other absorbent bodies, may be impregnated with an alkaline solution to provide the free alkali desired for the reaction. When a salt, which forms insoluble hydroxide or insoluble basic salt, is brought in contact with a body containing free lime, such for example as an asbestos cement shingle above mentioned, a double decomposition takes place resulting in the formation of calcium salt of the anion and the hydroxide or the basic salt of the metal. The salt added preferably is free from acid; otherwise the reaction will be one of neutralization until the acid is destroyed, thereby consuming much of the available lime without the formation of an insoluble compound.

The insoluble substance precipitating upon and in the surface of the body, binds the coloring matter securely so that it does not rub off. Inasmuch as lime is one of the components of the reaction and is transformed into a salt, the tendency to "bloom" is eliminated. The lime salt resulting from the reaction is either soluble, such as the chloride or nitrate and is washed away, or is insoluble, such as the sulphate and aids in fixing the coloring matter to the shingle. The insoluble compounds, which bind the coloring matter to the shingle and render the lime innocuous, are of a large variety of colors. Various shades and multi-colored effects may be obtained by choosing the color of the insoluble compound with reference to the color of the colored material to be fixed. By this means, it is possible to obtain practically any shade, color or color-effect desired.

As a general rule, the salts of those metals known as the "heavy metals" form insoluble compounds in the presence of alkaline substances. This is always true of the soluble salts of copper, silver, cadmium, mercury, chromium, manganese, and iron regardless of the nature of the alkaline substance and therefore with these metals, the alkaline substance may be caustic soda, caustic potash, ammonia or lime in any percentage. In the case of the amphoteric metals, for example zinc, aluminum and lead, the insoluble compound is formed as in the case of the other compounds except when caustic potash or soda is present in a large excess. With nickel and cobalt, the presence of an excess of ammonia results in the formation of a soluble complex ion salt. In using the amphoteric salts and those capable of forming complex ions, it is necessary that the salt be present in excess of the caustic soda, caustic potash or ammonia, as the case may be. If this excess is maintained or if lime is the alkaline substance present, then all the above metals are applicable for use according to the present invention. Hereafter in the specification or claims where phrasing similar to "a solution of metallic salt which will react with the alkaline substance to form an insoluble compound" is found, it presupposes the nature and concentration of the alkaline substance to be such that an insoluble compound is formed. Any salt of the metal is applicable for my invention, providing the salt is soluble; the salt may be the chloride (except with a silver or mercurous ion), the sulphate, the nitrate, the acetate, etc. As hereinbefore pointed out, however, it is preferable to use a neutral salt. At times, it is advantageous to use the sulphate of the metal due to the formation of the insoluble calcium sulphate which fills the pores of the shingle and reduces its porosity. However, when certain color effects are desirable, I find it best to employ a metallic salt as a fixing agent which will form a soluble calcium salt, thereby insuring that the natural color of the inorganic coating of the shingle will not be altered or deadened by the white insoluble calcium salt.

The concentrations which are applicable vary from saturation to a relatively dilute solution of about 15%. The length of time necessary to fix the powdered coating is somewhat dependent upon the concentration and may vary from ten minutes or even less up to an half hour or more. The solution is sprayed or otherwise applied to the surface in any convenient manner. When it is desired to obtain a mottled or multi-colored effect, a portion of the surface may be treated with one solution and the remaining with another, or at times it may be desirable to treat the surface for different lengths of time or with different concentrations of the same solution. These manipulative details may vary as the occasion demands.

The silver and mercury hydroxides which are formed upon the application of the corresponding salts decompose into the corresponding oxides, binding the coloring matter upon the shingle and coloring it a brownish black.

Zinc, cadmium, aluminum and manganese give colorless hydroxides and are particularly useful when the clear, natural color of the inorganic coloring matter is desired, since a shingle coated with a red, green or blue pigment will retain its clear color after fixing. Manganese hydroxide has a tendency to oxidize and for this reason is not as satisfactory for the purpose as the other named compounds. Since lead hydroxide is white, the fixing by means of a lead salt will give a white coating upon the shingles, thereby deadening the color of the surface coating. The chromium salts coat the shingle with the greenish chromium hydroxide. This is of particular value in fixing the green chrome oxide surface coating of the shingle.

I have found that the copper salts lend themselves particularly advantageously to my process. These salts give the greenish blue cupric hydroxide which color results in attractive colorations when used to fix the chrome oxide coating, the copper salts deepen the green somewhat, resulting in a very desirable shade. Copper nitrate, due to its stability and to the fact that the resulting calcium salt is soluble, has proved to be exceptionally applicable. I have found that a 20% solution allowed to stand on the shingle from ten to thirty minutes completely binds the chrome oxide on the surface of the shingle and the very desirable shade of green results.

Periodic Family VIII, of which iron, cobalt and nickel are members, deserves particular notice since the neutral salts of these three metals are adaptable for the binding of the inorganic coloring matter upon a shingle and the destroying of the bloom. A solution of ferrous sulphate, for example, when added to the shingle fixes the coloring matter and the ferrous hydroxide slowly oxidizes to ferric hydroxide which results in a brown coloration. As pointed out above, various concentrations and lengths of time of treatment may be employed and since these are somewhat a function of each other, the exact factors may be chosen as desired. I have found that a saturated solution of ferrous sulphate allowed to react upon the surface of the shingle until complete oxidation has taken place, gives a very satisfactory rich brown coloration. The neutral ferric salts may also be used and ferric sulphate also gives a very satisfactory brown color. The iron salts and particularly ferrous sulphate, is extremely useful if a multi-colored shingle is desired. The ferrous sulphate may be sprayed over portions of the surface, which will then be colored a deep rich brown due to oxidation, while the unsprayed surface will be the color of the inorganic coloring matter fixed upon the shingle by treatment with a dilute solution of ferrous sulphate or by a solution of another fixing agent.

Treatment with cobalt salts binds the inorganic coloring matter upon the shingle and gives a blue precipitate of the basic cobalt salt. This fixing agent is of use when blue effects are desired upon the surface of a shingle. Nickel salts bind the powdered coloring matter by the precipitant of green nickel hydroxide and can be used in the same manner to obtain the same results as the solutions of copper salts.

Heretofore, I have considered only the application of one salt to fix the coloring matter upon the shingle. It will be obvious that multi-colored or mottled effects may be obtained by using two or more of the inorganic fixing agents. An exceptionally desirable superimposed color effect results when both ferric sulphate and copper nitrate are used on a shingle coated with chromium oxide. Portions of the shingle are sprayed in any convenient manner with a saturated ferrous sulphate solution and the ferrous hydroxide formed is allowed to oxidize completely. The entire surface is then covered with a solution of copper nitrate of appropriate strength, such as a 20% solution. The green coloration is apparent on the surface of the shingle not already reacted upon by the ferrous sulphate, while those deposits where the copper and iron salts have come in contact will have a purple coloration. I may reverse this procedure by adding the copper salt over portions of the shingle and then treating the whole with the ferrous sulphate. The greenish blue coloration is not as evident as when the iron salt is added prior to the copper, but very rich brown and purple shades are obtained.

A deep brownish purple shingle is obtained by treating the entire surface of the shingle having a coating of chrome oxide with ferrous sulphate and allowing it to oxidize completely. The entire surface is then covered with a concentrated solution of copper nitrate and allowed to stand for about thirty minutes. The solutions are then washed off and the shingle dried. It will be obvious from these examples that various and in fact almost any desired color effect may be obtained by blending the inorganic coloring matter which is upon the surface of the shingle with the inorganic salts used to fix the coloring matter. The effects may be varied also by the concentration of the solution and the time allowed for the solutions to react and the manner of application. These various factors are somewhat dependent upon one another and the manipulation of them are all within the scope of my invention since they are merely details which practice of my invention will soon enable the artisan to master.

While I have given particular attention to the fixing of the inorganic coloring matter upon the surface of bodies containing free lime, the invention is also applicable to materials where the alkaline material is added expressly for the purpose of uniting with the salts and thereby binding the coloring matter to the surface. The same reaction takes place and in the event that caustic potash or soda is used instead of lime water, the salts formed by double decomposition will be the corresponding salts of the soda or potash.

Obviously also a product embodying the essential feature of my invention may be obtained by other processes and the invention is not limited to one particular process of manufacture, nor is there any limitation in the proportions of the inorganic coloring matter or in the manner of fixing or binding, since these may be largely varied to suit the particular taste and wishes for which the body treated is to be used.

I claim:

1. A process of treating a body having an alkaline reaction and inorganic coloring matter mechanically incorporated in its surface to bind said coloring matter firmly and relatively permanently in said surface which comprises applying to said surface a solution of a metallic salt and allowing said metallic salt to react with said alkaline substance of the body to form an insoluble compound in and at the surface of the body which physically binds said inorganic coloring matter firmly and relatively permanently on said surface.

2. A process of treating a body having an alkaline reaction and inorganic coloring matter mechanically incorporated in its surface to further color the body and to bind said coloring matter firmly and relatively permanently in said surface which comprises applying to said surface a solution of a metallic salt, the resulting insoluble compound of which is of a different color from that of the mechanically incorporated coloring matter, and allowing said metallic salt to react with said alkaline substance to form an insoluble colored compound in and at the surface of the body which physically binds said inorganic coloring matter firmly and relatively permanently on said surface.

3. A process of treating a body having an alkaline reaction and inorganic coloring matter mechanically incorporated in its surface to further color the body and to bind said coloring matter firmly and relatively permanently in said surface which comprises applying to said surface a plurality of metallic salts in solution, the resulting insoluble compound of at least one of which is of a different color from that of the mechanically incorporated coloring matter, and allowing said metallic salts to react with said alkaline substance to form insoluble compounds in and at the surface of the body which physically bind said inorganic coloring matter firmly and relatively permanently on said surface.

4. A process of treating a body having an alkaline reaction and inorganic coloring matter mechanically incorporated in its surface to further color the body and to bind said coloring matter firmly and relatively permanently on said surface which comprises applying to a portion of the surface of said body a solution of a metallic salt which reacts with a portion of the alkaline substance to form a colored insoluble compound followed by treatment of another portion of the body with a second metallic salt solution which also reacts with the alkaline substance to form an insoluble compound of a different color from that of the first reaction, both insoluble colored compounds physically binding said inorganic coloring matter firmly and relatively permanently on said surface and producing with said inorganic coloring matter a multi-colored body of blended color effects.

5. A colored body having an alkaline reaction and having an inorganic coloring matter mechanically incorporated in its surface and physically bound thereon firmly and relatively permanently by an insoluble inorganic deposit.

6. A colored body having an alkaline reaction and having an inorganic coloring matter mechanically incorporated in its surface and physically bound thereon firmly and relatively permanently, and the color effect of the body altered by an insoluble colored inorganic deposit.

7. A colored body having an alkaline reaction and having an inorganic coloring matter mechanically incorporated in its surface and physically bound thereon firmly and relatively permanently, and the color effect of the body altered by a plurality of insoluble, colored inorganic deposits.

8. A blended colored body having an alkaline reaction and having inorganic coloring matter mechanically incorporated in its surface and physically bound thereon firmly and relatively permanently by insoluble, colored inorganic deposits, the said inorganic deposits being of different colors from each other and located upon the body in overlapping but not in co-extensive areas.

In testimony whereof I have signed my name to this specification.

CLEMENTS BATCHELLER.